United States Patent [19]

Kennedy, III et al.

[11] Patent Number: 5,734,981
[45] Date of Patent: Mar. 31, 1998

[54] METHOD AND APPARATUS FOR CALL DELIVERY TO A MOBILE UNIT

[75] Inventors: William C. Kennedy, III, Dallas; Thomas D. Russell, Plano; Kenneth R. Westerlage, Fort Worth, all of Tex.

[73] Assignee: HighwayMaster Communications, Inc., Dallas, Tex.

[21] Appl. No.: 406,022

[22] Filed: Mar. 17, 1995

Related U.S. Application Data

[63] Continuation-in-part of Ser. No. 95,166, Jul. 29, 1993, abandoned, which is a continuation-in-part of Ser. No. 279,211, Jul. 22, 1994, Pat. No. 5,513,111, which is a continuation of Ser. No. 178,022, Jan. 6, 1994, Pat. No. 5,398,190, which is a continuation of Ser. No. 920,644, Jul. 28, 1992, Pat. No. 5,299,132, which is a continuation of Ser. No. 642,436, Jan. 17, 1991, Pat. No. 5,155,689, said Ser. No. 95,166, is a continuation-in-part of Ser. No. 826,521, Jan. 27, 1992, abandoned.

[51] Int. Cl.⁶ .................................................. H04Q 7/38
[52] U.S. Cl. .......................... 455/445; 455/456; 455/459; 455/567
[58] Field of Search .................................. 379/58, 59, 60, 379/57; 455/33.1, 33.2, 54.1, 422, 427, 432, 435, 445, 456, 461, 550, 567, 458, 459

[56] References Cited

U.S. PATENT DOCUMENTS

| | | | |
|---|---|---|---|
| Re. 34,034 | 8/1992 | O'Sullivan | 379/59 |
| 3,518,674 | 6/1970 | Moorehead et al. | 343/112 |
| 3,680,121 | 7/1972 | Anderson et al. | 343/112 TC |
| 3,714,650 | 1/1973 | Fuller et al. | 343/6.5 LC |
| 3,757,290 | 9/1973 | Ross et al. | 340/23 |
| 3,789,409 | 1/1974 | Easton | 343/112 R |
| 3,848,254 | 11/1974 | Drebinger et al. | 343/112 R |
| 3,906,166 | 9/1975 | Cooper et al. | 179/41 A |
| 4,053,893 | 10/1977 | Boyer | 343/112 PT |
| 4,083,003 | 4/1978 | Haemming | 325/6 |

(List continued on next page.)

FOREIGN PATENT DOCUMENTS

| | | | |
|---|---|---|---|
| 3767589 | 2/1993 | Australia . | |
| 0242099 | 10/1987 | European Pat. Off. | G01S 5/14 |
| 0290725 | 11/1988 | European Pat. Off. . | |
| 0367935 | 5/1990 | European Pat. Off. . | |
| 2376583 | 7/1978 | France | H04Q 7/04 |
| 3516357 | 11/1986 | Germany | H04B 7/26 |
| 1542794 | 3/1979 | United Kingdom | H04Q 7/04 |
| 2193861 | 2/1988 | United Kingdom . | |
| 2221113 | 1/1993 | United Kingdom . | |
| WO8904035 | 5/1989 | WIPO . | |
| WO8912835 | 12/1989 | WIPO . | |

OTHER PUBLICATIONS

First Written Opinion for International Patent Application No. PCT/US96/03250 dated Mar. 7, 1997.

European Search Report, dated Dec. 23, 1996, for European Patent Application 96113063.0.

"Trimpack" Brochure, TrimpleNavigation, date unknown, 1 page.

(List continued on next page.)

*Primary Examiner*—Dwayne Trost
*Assistant Examiner*—William G. Trost
*Attorney, Agent, or Firm*—Baker & Botts, L.L.P.

[57] ABSTRACT

A call delivery system (10) for delivering a call to a mobile unit (12) on a vehicle (14) includes both a data communications network (16) and a mobile voice communications network (20). The mobile unit (12) generates call delivery information and communicates this information to a platform (18) using the data communications network (16). The platform (18) receives a call for the mobile unit (12). The platform (18) retrieves call delivery information received from the mobile unit (12) and establishes communications between the platform (18) and the mobile unit (12) using the mobile voice communications network (20). The platform then completes the call between the caller (36, 40, 44) and the mobile unit (12). Alternatively, the platform (18) can generate a call back message for transmission to the mobile unit (12) using the data communications network (16).

28 Claims, 6 Drawing Sheets

U.S. PATENT DOCUMENTS

| | | | |
|---|---|---|---|
| 4,107,689 | 8/1978 | Jellinek | 343/23 |
| 4,152,693 | 5/1979 | Ashworth, Jr. | 340/24 |
| 4,177,466 | 12/1979 | Reagan | 343/112 TC |
| 4,222,052 | 9/1980 | Dunn | 343/112 R |
| 4,428,052 | 1/1984 | Robinson et al. | 364/436 |
| 4,428,057 | 1/1984 | Setliff et al. | 364/521 |
| 4,435,711 | 3/1984 | Ho et al. | 343/389 |
| 4,445,118 | 4/1984 | Taylor et al. | 343/357 |
| 4,547,778 | 10/1985 | Hinkle et al. | 343/456 |
| 4,590,569 | 5/1986 | Rogoff et al. | 364/452 |
| 4,644,351 | 2/1987 | Zabarsky et al. | 340/825.44 |
| 4,651,157 | 3/1987 | Gray et al. | 342/457 |
| 4,654,879 | 3/1987 | Goldman et al. | 455/33 |
| 4,660,037 | 4/1987 | Nakamura | 340/990 |
| 4,670,905 | 6/1987 | Sandvos et al. | 455/33 |
| 4,688,244 | 8/1987 | Hannon et al. | 379/58 |
| 4,700,374 | 10/1987 | Bini | 379/60 |
| 4,734,928 | 3/1988 | Weiner et al. | 379/59 |
| 4,737,978 | 4/1988 | Burke et al. | 379/60 |
| 4,740,792 | 4/1988 | Sagey et al. | 342/457 |
| 4,742,357 | 5/1988 | Rackley | 342/457 |
| 4,750,197 | 6/1988 | Denekamp et al. | 379/58 |
| 4,754,465 | 6/1988 | Trimble | 375/1 |
| 4,774,670 | 9/1988 | Palmieri | 364/446 |
| 4,775,999 | 10/1988 | Williams | 379/59 |
| 4,776,003 | 10/1988 | Harris | 379/91 |
| 4,788,637 | 11/1988 | Tamaru | 364/200 |
| 4,791,571 | 12/1988 | Takahashi et al. | 364/436 |
| 4,791,572 | 12/1988 | Green, III et al. | 364/449 |
| 4,796,189 | 1/1989 | Nakayama et al. | 364/449 |
| 4,797,948 | 1/1989 | Milliorn et al. | 455/54 |
| 4,799,162 | 1/1989 | Shinkawa et al. | 364/436 |
| 4,804,937 | 2/1989 | Barbiaux et al. | 340/52 F |
| 4,809,005 | 2/1989 | Counselman, III | 342/352 |
| 4,819,174 | 4/1989 | Furuno et al. | 364/444 |
| 4,833,477 | 5/1989 | Tendler | 342/389 |
| 4,833,701 | 5/1989 | Comroe et al. | 379/60 |
| 4,833,702 | 5/1989 | Shitara et al. | 379/60 |
| 4,843,575 | 6/1989 | Crane | 364/550 |
| 4,860,341 | 8/1989 | D'Avello et al. | 379/91 |
| 4,866,762 | 9/1989 | Pintar | 379/200 |
| 4,876,738 | 10/1989 | Selby | 455/33 |
| 4,884,208 | 11/1989 | Marinelli et al. | 364/460 |
| 4,891,650 | 1/1990 | Sheffer | 342/457 |
| 4,891,761 | 1/1990 | Gray et al. | 364/452 |
| 4,897,642 | 1/1990 | DiLullo et al. | 340/825.06 |
| 4,901,340 | 2/1990 | Parker et al. | 379/60 |
| 4,905,270 | 2/1990 | Ono | 379/58 |
| 4,907,290 | 3/1990 | Crompton | 455/56 |
| 4,908,629 | 3/1990 | Apsell et al. | 342/457 |
| 4,912,756 | 3/1990 | Hop | 379/60 |
| 4,914,686 | 4/1990 | Hagar, III et al. | 379/61 |
| 4,945,570 | 7/1990 | Gerson et al. | 381/110 |
| 4,953,198 | 8/1990 | Daly et al. | 379/61 |
| 4,963,865 | 10/1990 | Ichikawa et al. | 340/995 |
| 4,972,457 | 11/1990 | O'Sullivan | 379/59 |
| 4,993,062 | 2/1991 | Dula et al. | 379/88 |
| 4,998,291 | 3/1991 | Marui et al. | 455/89 |
| 5,003,317 | 3/1991 | Gray et al. | 342/457 |
| 5,008,814 | 4/1991 | Mathur | 364/200 |
| 5,014,206 | 5/1991 | Scribner et al. | 364/449 |
| 5,019,963 | 5/1991 | Alderson et al. | 364/200 |
| 5,025,253 | 6/1991 | DiLullo et al. | 340/825.06 |
| 5,032,845 | 7/1991 | Velasco | 342/457 |
| 5,043,736 | 8/1991 | Darnell et al. | 342/357 |
| 5,045,861 | 9/1991 | Duffett-Smith | 342/457 |
| 5,046,082 | 9/1991 | Zicker et al. | 379/59 |
| 5,055,851 | 10/1991 | Sheffer | 342/457 |
| 5,058,201 | 10/1991 | Ishii et al. | 455/33 |
| 5,068,656 | 11/1991 | Sutherland | 340/989 |
| 5,090,050 | 2/1992 | Heffernan | 379/60 |
| 5,101,500 | 3/1992 | Marui | 455/33 |
| 5,119,102 | 6/1992 | Barnard | 342/357 |
| 5,121,126 | 6/1992 | Clagett | 342/419 |
| 5,121,325 | 6/1992 | DeJonge | 364/442 |
| 5,131,019 | 7/1992 | Sheffer et al. | 379/39 |
| 5,131,020 | 7/1992 | Liebesny et al. | 379/59 |
| 5,142,281 | 8/1992 | Park | 340/991 |
| 5,142,654 | 8/1992 | Sonberg et al. | 379/59 |
| 5,155,490 | 10/1992 | Spradley, Jr. et al. | 342/357 |
| 5,155,847 | 10/1992 | Kirouac et al. | 395/600 |
| 5,159,625 | 10/1992 | Zicker | 379/59 |
| 5,166,694 | 11/1992 | Russell et al. | 342/457 |
| 5,172,321 | 12/1992 | Ghaem et al. | 364/444 |
| 5,208,756 | 5/1993 | Song | 364/449 |
| 5,223,844 | 6/1993 | Mansell et al. | 342/357 |
| 5,225,842 | 7/1993 | Brown et al. | 342/357 |
| 5,235,633 | 8/1993 | Dennison et al. | 379/60 |
| 5,237,612 | 8/1993 | Raith | 380/23 |
| 5,243,529 | 9/1993 | Kashiwazaki | 364/449 |
| 5,247,564 | 9/1993 | Zicker | 379/40 |
| 5,252,982 | 10/1993 | Frei | 342/357 |
| 5,261,118 | 11/1993 | Vanderspool, II et al. | 455/51.2 |
| 5,270,936 | 12/1993 | Fukushima et al. | 364/444 |
| 5,276,729 | 1/1994 | Higuchi et al. | 379/58 |
| 5,293,163 | 3/1994 | Kakihara et al. | 340/995 |
| 5,297,191 | 3/1994 | Gerszberg | 379/59 |
| 5,297,192 | 3/1994 | Gerszberg | 379/59 |
| 5,299,132 | 3/1994 | Wortham | 364/460 |
| 5,311,194 | 5/1994 | Brown | 342/357 |
| 5,323,322 | 6/1994 | Mueller et al. | 364/449 |
| 5,327,486 | 7/1994 | Wolff et al. | 379/58 |
| 5,341,410 | 8/1994 | Aron et al. | 379/59 |
| 5,365,516 | 11/1994 | Jandrell | 370/18 |
| 5,388,147 | 2/1995 | Grimes | 379/59 |
| 5,392,458 | 2/1995 | Sasuta et al. | 455/54.1 |
| 5,396,540 | 3/1995 | Gooch | 379/59 |
| 5,414,750 | 5/1995 | Bhagat et al. | 379/57 |
| 5,506,886 | 4/1996 | Maine | 379/59 |

OTHER PUBLICATIONS

Gary D. Ott, "Vehicle Location in Cellular Mobile Radio Systems," *IEEE*, vol. VT–26, No. 1, Feb., 1977, pp. 43–46.

James C. Reynolds, et al., "GPS–Based Vessel Position Monitoring and Display System," IEEE, 1990, pp. 601–607.

R. DeSadaba, "Personal Communications in the Intelligent Network," *British Telecommunications Engineering*, vol. 9, Aug., 1990, pp. 80–83.

"GPS Navstar Global Positioning System User's Overview–YEE–82–009D," *Navstar Global Positioning System Joint Program Office*, Mar., 1991, pp. 1–164.

"U.S. Coast Guard Differential GPS" Brochure, *U.S. Department of Transportation, United States Coast Guard*, May, 1993.

"GPS Facts & Figures" Brochure, *U.S. Department of Transportation, United States Coast Guard*, May, 1993.

D. H. Alsip, J. M. Butler, and J. T. Radice, "Implementation of the U.S. Coast Guard's Differential GPS Navigation Service," *U.S. Coast Guard Headquarters, Office of Navigation Safety and Waterway Services, Radionavigation Division*, Jun. 28, 1993, pp. 1–10.

"Motorola GPS Technical Reference Manual," *Motorola*, Oct., 1993, Manual Cover, Title Page, and pp. 4–109.

Don Burtis, "CDPD—A Bandwidth Optimization Technique for Cellular Telephones," *Computer Design's OEM Integration*, May, 1994, pp. 19–20.

"U.S. Coast Guard Bulletin Board System File 'FRP–DGPS,'" *U.S. Coast Guard*, Date Unknown, pp. 1–6.

Gene L. Schlechte, LCDR, "U.S. Coast Guard Bulletin Board System Document 'Design.Txt'–Design Process for the United States Coast Guard's Differential GPS Navigation Service," *U.S. Coast Guard, U.S. Coast Guard Omega Navigation System Center*, Date Unknown, pp. 1–21.

"Appendix B, The 1991 Radionavigation User Conference," *Department of Transportation*, Date Unknown, pp. 1–2.

Kirk Ladendorf, "First in Flight—Using State–Of–The–Art Technology, Austin–Base Arrowsmith Technologies Establishes Itself As A Major Player in Nascent Technology–Supplier Market," *Austin America–Statesman*, Jan. 30, 1995, 3 pages.

METHOD AND APPARATUS FOR CALL DELIVERY TO A MOBILE UNIT

RELATED APPLICATIONS

This application is a continuation-in-part application of U.S. Pat. application Ser. No. 08/095,166, entitled "Method and Apparatus for a Nation-Wide Cellular Telephone Network," filed on Jul. 29, 1993 now abandoned, and assigned to HM Holding Corporation of Dallas, Tex., which is a continuation-in-part application of U.S. Pat. application Ser. No. 07/826,521, entitled "Phantom Mobile Identification Number Method and Apparatus," filed on Jan. 27, 1992 and assigned to By-Word Technologies, Inc. of Dallas, Tex., now abandoned.

This application is also a continuation-in-part application of U.S. Pat. application Ser. No. 08/279,211, entitled "Vehicle Locating and Communicating Method and Apparatus," filed on Jul. 22, 1994, now U.S. Pat. No. 5,513,111, which is a continuation application of U.S. Pat. Ser. No. 08/178,022, entitled "Vehicle Locating and Communicating Method and Apparatus," filed Jan. 6, 1994, now U.S. Pat. No. 5,398,190, which is a continuation application of U.S. Pat. application Ser. No. 07/920,644, entitled "Vehicle Locating and Communicating Method and Apparatus," filed on Jul. 28, 1992, now U.S. Pat. No. 5,299,132, which is a continuation of U.S. Pat. application Ser. No. 07/642,436, entitled "Vehicle Locating and Communicating Method and Apparatus," filed on Jan. 17, 1991, now U.S. Pat. No. 5,155,689.

TECHNICAL FIELD OF THE INVENTION

This invention relates generally to the field of telecommunications, and more particularly to a method and apparatus for call delivery to a mobile unit.

BACKGROUND OF THE INVENTION

Mobile voice communications technology has enjoyed substantial growth over the past decade. Many cars, trucks, airplanes, boats, and other vehicles are equipped with devices that allow convenient and reliable mobile voice communications using a network of satellite-based or land-based transceivers. Advances in this technology have led to widespread use of mobile units, such as hand-held or vehicle-mounted cellular telephones, for voice communications.

Many users of mobile units desire continuous and reliable service as they travel across long distances. For example, a cellular telephone in a vehicle or carried by a person may travel through many different cellular systems offering a range of subscriber features. Calls placed to these roaming phones must be routed to the current communications service provider. Traditional roaming technology delivers calls placed to these roaming phones using the communications infrastructure of the cellular telephone network. Typically, the roaming phone registers with a communications service provider and notifies the home communications service provider of the registration.

The roaming services provided through the cellular telephone infrastructure introduce additional complexity and communications traffic in the system and come at a substantial cost to the end user. The communications service providers utilize additional equipment and communications bandwidth to register roamers and report the registration to the home switch of the roaming phone. Users are charged a premium for these services.

SUMMARY OF THE INVENTION

In accordance with the present invention, the disadvantages and problems associated with previous techniques used to deliver calls to a mobile unit has been substantially reduced or eliminated. One aspect of the present invention provides a system for delivering a call to a mobile unit that utilizes a data communications network for communicating call delivery information.

According to an embodiment of the present invention, a system for delivering a voice call to a mobile unit includes a mobile voice communications network and a data communications network. The mobile unit includes a data transmitter coupled to the data communications network that communicates call delivery information using the data communications network. The mobile unit also includes a mobile voice communications transceiver coupled to the mobile voice communications network. A platform coupled to the data communications network and the mobile voice communications network includes a data receiver that receives call delivery information communicated by the data transmitter of the mobile unit. The platform receives the voice call and delivers the voice call, in response to the call delivery information received by the data receiver, to the mobile voice communications transceiver of the mobile unit.

According to another embodiment of the present invention, a method for delivering a voice call to a mobile unit includes generating call delivery information at the mobile unit. The mobile unit communicates the call delivery information to a platform using a data communications network. A voice call for the mobile unit is received at the platform. A communications link is established, in response to the call delivery information received from the mobile unit, between the platform and the mobile unit using a mobile voice communications network. The voice call is coupled to the communications link.

Important technical advantages of the present invention include the integration of a data communications network to provide call delivery information for a mobile voice communications network. Numerous technologies, including both satellite-based and land-based data messaging systems, may be integrated with a mobile voice communications network to provide call delivery information. One or more of these data communications technologies support inexpensive and dependable call delivery to roaming subscribers. Another technical advantage includes reducing the communications traffic and complexity of existing mobile voice communications networks. For example, the cellular telephone network devotes considerable communications bandwidth and equipment to support the registration and notification of roaming subscribers. The present invention off-loads much of the roaming support services to existing data communications technology, which provide either centralized or distributed control of call delivery functions. The present invention also reduces the expenses associated with the mobile voice communications network, for both the communications service provider and the roaming subscriber. The system achieves significant cost savings by utilizing existing, inexpensive data communications technology to reduce the traffic and complexity of the mobile voice communications network. Important technical advantages also include a reduction in roamer fraud through centralized control of call delivery services. Other technical advantages are readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, wherein like reference numerals represent like parts, in which.

DETAILED DESCRIPTION OF THE INVENTION

Figure 1:
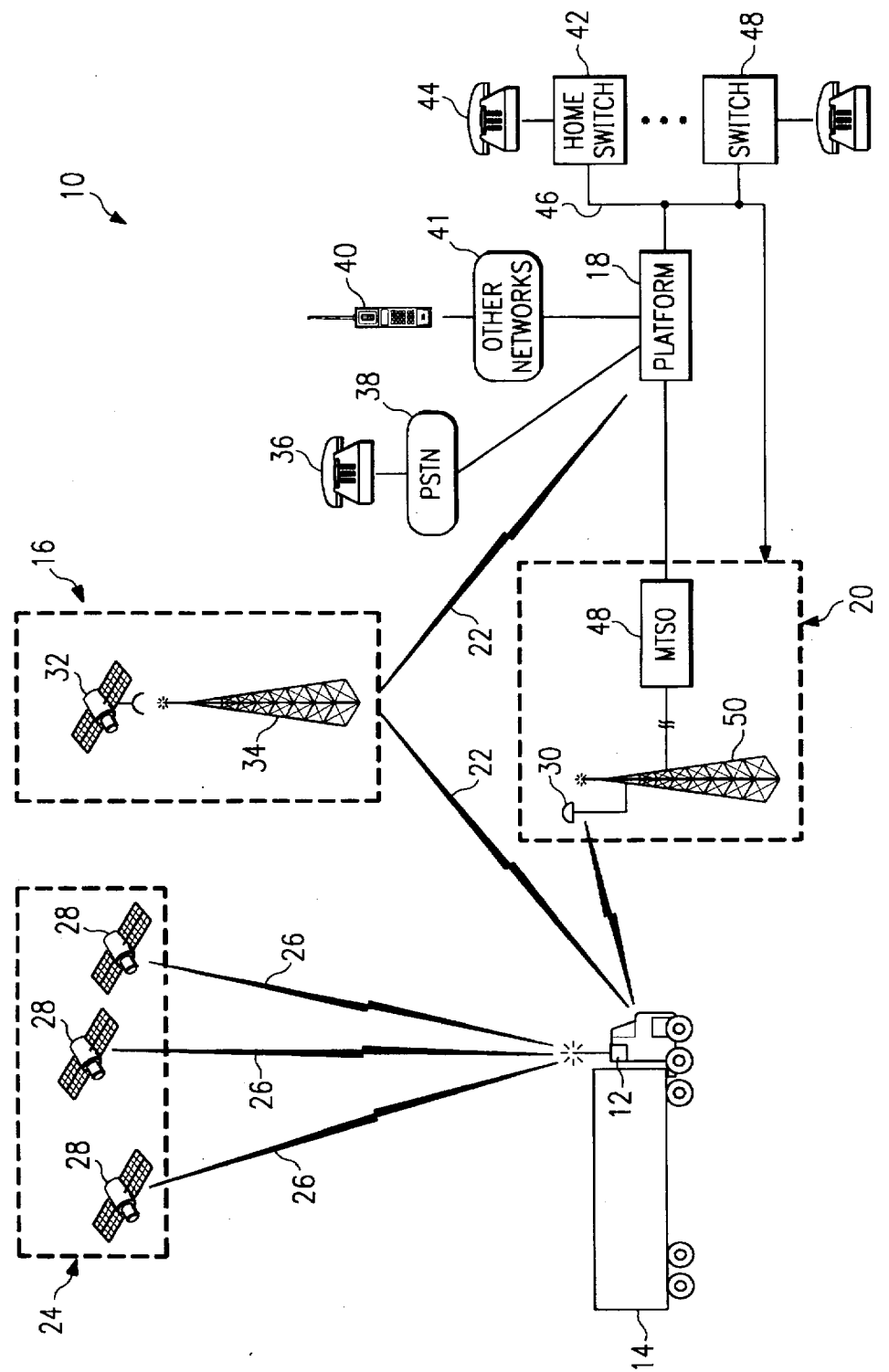
FIG. 1 illustrates a system for delivering calls to a mobile unit.

FIG. 1 illustrates a call delivery system 10 that delivers a call to mobile unit 12 on vehicle 14. Call delivery system 10 includes mobile unit 12, a data communications network 16, a platform 18, and a mobile voice communications network 20. In operation, mobile unit 12 communicates call delivery information to platform 18 using data communications network 16. Platform 18 delivers a call to mobile unit 12 over mobile voice communications network 20 using the call delivery information. In an alternative operation, platform 18 communicates a call back message to mobile unit 12 using data communications network 16.

Mobile unit 12 is shown on vehicle 14, however, mobile unit 12 may be carried by all types of vehicles, including cars, trucks, airplanes, boats, barges, railcars, truck trailers, or on a person's body, along with a package, or with any other movable object benefitting from mobile communications services. As described in more detail in FIG. 2, mobile unit 12 includes both a data transceiver for communicating call delivery information and a transceiver for conducting a call over mobile voice communications network 20.

In one embodiment, mobile unit 12 initiates the call delivery process by generating call delivery information and delivering this information over data link 22 of data communications network 16 to platform 18. Call delivery information represents any information that allows platform 18 to deliver calls to mobile unit 12. For example, call delivery information includes information relating to the communications service provider in mobile voice communications network 20 that currently services mobile unit 12. This information includes a system identification number (SID), a mobile serving carrier I.D. (MSCID), a switch I.D. (SWID), or any other identifier of the communications service provider. Furthermore, call delivery information can be an access number for the communications service provider, such as a number for a roamer access port (RAP). Another form of call delivery information relating to the communications service provider is rural service area (RSA) information or information associated with automatic registration under the IS-41 standard, such as a temporary local dialing number (TLDN). This type of call delivery information relating to the communications service provider of mobile unit 12 may be used by platform 18 to either directly or indirectly deliver a call to mobile unit 12.

Call delivery information also includes positional information of mobile unit 12. Mobile unit 12 equipped with a positioning receiver may obtain position information from a satellite-based or land-based positioning system 24. Mobile unit 12 receives position information over position information streams 26 from a plurality of satellites 28. The position information comprises accurate satellite location information and pseudorange data represented by the time of arrival of position information streams 26 to mobile unit 12.

Positioning system 24 is illustrated as a satellite-based radio navigation system such as the NAVSTAR global positioning system (GPS). The NAVSTAR GPS is a representative positioning system 24, but any land-based or satellite-based system may be used. For example, positioning system 24 may be a land-based LORAN-C, a space-based GLONASS, or any other system using radio frequency (RF) triangulation positioning technology. Positioning system 24 can represent spaced-based or land-based transmitters that emit position information. In addition, positioning system 24 can be a network of roadside positional tags that can be detected by a reading device on vehicle 14.

Satellites 28 maintain accurate and synchronized time and simultaneously transmit position information that contains satellite specific and system information. The position information transmitted by satellites 28 includes high precision clock and ephemeris data for a particular satellite, low precision clock and ephemeris data for every satellite in a constellation ("almanac data"), health and configuration status for all satellites, user text messages, and other parameters describing operation of positioning system 24.

Positioning system 24 can include additional satellites and one or more positioning receivers. In one embodiment, a positioning receiver 30 mounted on transmitter 50 in mobile voice communications network 20 implements differential GPS techniques. Positioning receiver 30 generates correction data that enables mobile unit 12 to more accurately determine the position of vehicle 14. Positioning receiver 30 transmits the correction data to mobile unit 12 over any suitable link, including a link supported by mobile voice communications network 20.

Mobile unit 12 can also generate position information using an on-board positioning sensor. For example, an inertial navigation sensor on vehicle 14 integrates accelerations imparted to vehicle 14 to determine current position. A dead reckoning sensor computes vehicle location based on compass orientation and distance travelled at that orientation. A dead reckoning sensor of vehicle 14 includes a direction finder, such as a compass, integrated with a distance sensor, such as an odometer or tire rotation counter, to track the location of vehicle 14 and determine its current position. Mobile unit 12 can also include a device to read roadside positional tags to determine location of vehicle 14.

Mobile unit 12 compiles call delivery information, either relating to the communications service provider of mobile unit 12 or positional information of mobile unit 12 or vehicle 14, into a call delivery information report. To minimize costs and to reduce load on data communications system 16, the call delivery information report should be as brief as possible. Mobile unit 12 can either send the raw call delivery information or pre-process this information to further reduce the report size. Platform 18 can further process the received call delivery information based on the processing already performed by mobile unit 12, the nature of the call delivery information, and other considerations. The present invention contemplates any arrangement and coordination of call delivery information processing tasks between mobile unit 12 and platform 18.

Mobile unit 12 communicates the call delivery information report over data link 22 of data communications network 16 to platform 18. Data communications network 16 represents any type of data messaging network, using land-based or spaced-based transceivers, repeaters, or transmitters, that supports communication of data from mobile unit 12 to platform 18. A spaced-based data messaging system uses one or more satellites 32 that receive communications from mobile unit 12 and retransmit the communications to platform 18. The satellites may be in geostationary orbit, low earth orbit (LEO), or any other configuration, and may utilize any suitable frequency band of communications. A land-based data communications network includes one or more land-based transmitters 34 that communicate data over dedicated or public switched data lines. For example, land-based transmitter 34 may be a component of the land-line or mobile public switched telephone network (PSTN), a communication link such as a T1 trunk, the SS7 backbone infrastructure of the PSTN, a private data network, or any other suitable data communications network. Data communications network 16 represents one or a combination of the data messaging technologies discussed above.

In one embodiment of the present invention, data communications network 16 operates separately and independently from mobile voice communications network 20. For example, call delivery system 10 can use a satellite-based data messaging system for communicating call delivery information to deliver a voice call using the cellular telephone network. Using one system for communicating data and another system for conducting voice communications provides several advantages. One or a combination of data messaging technologies mentioned above provide inexpensive communications of call delivery information throughout the country. Call delivery information can be communicated to platform 18 using these technologies at a fraction of the cost of current roamer services provided by the cellular telephone network. Furthermore, the use of a separate network to manage call delivery information reduces or eliminates the complexity and expense of roamer registration and reporting features in mobile voice communications network 20.

Current roamer registration and notification procedures increase the already crowded communications channels in the cellular telephone network, and require additional equipment and expense to operate. Furthermore, different cellular telephone systems offer different roaming subscriber support, which further complicates integration of registration and reporting services among systems. For example, some of the larger cellular telephone systems offer automatic roamer registration using the IS-41 standard, while smaller and rural providers only support manual registration. The present invention provides consistent and dependable call delivery services through the use of a separate data communications network 16 and platform 18 without increasing the cost or complexity of mobile voice communications network 20.

The choice of a proper data communications technology depends on several considerations. The chosen data communications network 16 should provide coverage in areas travelled by mobile unit 12. In addition, data communications network 16 should provide inexpensive data communications that can handle relatively small data packages containing call delivery information. Based on these constraints of coverage area and expense, call delivery system 10 can use one or a combination of the data communications technologies mentioned above.

Upon receipt of call delivery information transmitted by mobile unit 12 over data communications network 16, platform 18 stores the call delivery information for later retrieval. Platform 18 stores call delivery information indexed by or identified with a particular mobile unit 12. Over time, platform 18 constructs a table containing time-stamped call delivery information reports associated with a particular mobile unit 12.

Platform 18 receives a call for mobile unit 12 from a variety of sources. The call can originate from a caller 36 of the public switched telephone network (PSTN) 38. PSTN 38 includes the traditional land-line telephone network and the network of cellular telephone systems. Using PSTN 38, caller 36 directs the call to platform 18 by inputting a traditional telephone number associated with platform 18 or mobile unit 12. In one embodiment, caller 36 inputs a 1+800 number to connect to platform 18.

A caller 40 can initiate calls to mobile unit 12 using other communications networks 41, such as a specialized mobile radio (SMR), enhanced specialized mobile radio (ESMR), a personal communications service (PCS), a citizens band (CB), a dedicated radio system, such as those used by police and firefighters, or any other suitable communications link that allows caller 40 to direct a call to platform 18.

Generally, platform 18 couples with PSTN 38 and other networks 41 to receive calls for mobile unit 12 from callers 36 and 40. Platform 18 also communicates with specific components of PSTN 38 to facilitate call delivery. Platform 18 communicates with a home switch 42 of mobile unit 12. In one embodiment, a caller 44 dials a number associated with mobile unit 12, which is received by home switch 42. Home switch 42 recognizes that mobile unit 12 is out of its service area and transfers the call to platform 18 over a suitable link 46. This allows caller 44 to directly dial a traditional telephone number for mobile unit 12 and still benefit from call delivery system 10.

Platform 18 can provide home switch 42 with call delivery information received from mobile unit 12 over link 46. Home switch 42 can use this call delivery information received from platform 18 to deliver a call to mobile unit 12 placed by caller 44 without additional assistance from platform 18. Other switches 48 also receive call delivery information from platform 18 in a similar manner as home switch 42.

It should be understood that the present invention contemplates integration of the components and functionality of platform 18, home switch 42, and switch 48. In particular, platform 18 can be integrated or associated with home switch 42, and operate to receive and store call delivery information reports for later retrieval by home switch 42. Platform 18 can also implement other more advanced telecommunications features, such as those offered by a central office (CO) or mobile telecommunications switching office (MTSO) of PSTN 38. Call delivery system 10 supports calls placed to mobile unit 12 from a variety of callers 36, 40, and 44, collectively represented by an exemplary caller 36, using a variety of communications technology. Furthermore, platform 18 itself can initiate calls to mobile unit 12.

After receiving a call for mobile unit 12 from caller 36, platform 18 retrieves the most recent call delivery information received from mobile unit 12. Depending on the type of call delivery information, platform 18 either immediately establishes voice communications with mobile unit 12 or performs a further database look-up or other processing to determine the communications service provider of mobile unit 12 and the proper procedure for establishing voice communications. If the call delivery information is a position of mobile unit 12 or vehicle 14, platform 18 relates the position to a communications service provider. Platform 18 maintains a list of MSCIDs, SIDs, SWIDs, NPAs, RAPs, and other communications service provider identifiers, correlated with geographical service area, to determine the proper access number and calling procedure to establish a communications link with mobile unit 12.

Platform 18 can also extrapolate or predict the position of vehicle 14 to produce an estimated vehicle position. This estimation can be based on the expected route of vehicle 14, its intended destination, or other parameters impacting the route and travel time of vehicle 14. Platform 18 can use data stored in its memory to calculate an estimated vehicle position, or data for calculation can be transmitted from mobile unit 12 to platform 18 either separately or along with the call delivery information report. Platform 18 determines the proper access number and calling procedure to establish a communications link with mobile unit 12 based on the estimated position of vehicle 14. Furthermore, platform 18 can periodically compute an estimated position of vehicle 14 and generate an in-service signal that indicates that the estimated position of vehicle 14 is within the service area of mobile voice communications network 20.

After determining the access number and calling procedure, platform 18 establishes communications with mobile unit 12 over mobile voice communications network 20. Platform 18 directly dials mobile unit 12 if it has received or can compute a direct dial number for mobile unit 12. In other cases, platform 18 establishes a communications link with mobile unit 12 through a two-step dialing method using a RAP or other communications port of the communications service provider of mobile unit 12. Using the RAP, platform 18 dials the communications service provider, receives a new dial tone, and then dials the specific number for mobile unit 12.

Mobile voice communications network 20 represents any technology that supports mobile voice communications. Mobile voice communications network 20 can be the cellular telephone network, or any other satellite-based or land-based mobile voice communications network, such as a specialized mobile radio (SMR), an enhanced specialized mobile radio (ESMR), a personal communications service (PCS), a citizens band (CB), a dedicated radio system, such as those used by police and firefighters, or any other suitable mobile voice communications system. In the specific example of a cellular telephone network, mobile voice communications network 20 includes a mobile telecommunications switching office (MTSO) 48 coupled to a cellular transmitter 50 servicing mobile unit 12.

In another embodiment, platform 18 initiates the call delivery process upon receiving a call from caller 36 for mobile unit 12. Using the data communications network 16, platform 18 communicates a call back message to mobile unit 12. This call back message can be directed to mobile unit 12 based on location information stored at platform 18, or the call back message can be broadcast over data communications network 16 without knowing the location of mobile unit 12. For example, some data communications technologies may require an exact or approximate position of mobile unit 12 to deliver the call back message, whereas other data communications technologies, such as paging systems, can deliver a call back message without location information of mobile unit 12. The call back message can request mobile unit 12 to call platform 18 or caller 36 directly.

In operation of one embodiment of call delivery system 10, mobile unit 12 generates call delivery information relating to its position or its communications service provider.

Mobile unit 12 communicates the call delivery information to platform 18 using data link 22 of data communications network 16. Platform 18 stores the call delivery information and awaits a call for mobile unit 12. Upon receiving a call from caller 36, platform 18 retrieves the most recently reported call delivery information for mobile unit 12. Platform 18 uses the call delivery information to establish a communications link between platform 18 and mobile unit 12 using mobile voice communications network 20. Upon establishing a communications link, platform 18 connects the call from caller 36 to mobile unit 12.

In operation of another embodiment of call delivery system 10, platform 18 receives call delivery information from mobile unit 12 over data link 22 and provides this call delivery information to home switch 42 over link 46. Home switch 42 then utilizes the call delivery information in a similar fashion as described by platform 18, and directly delivers the call to mobile unit 12 over mobile voice communications network 20. Similarly, platform 18 can provide call delivery information to other switches 48 that receive calls to be delivered to mobile unit 12.

In operation of another embodiment of call delivery system 10, platform 18 receives a call for mobile unit 12 from caller 36. Using data link 22 of data communications network 16, platform 18 transmits a call back message to mobile unit 12, specifying mobile unit 12 to call platform 18 or caller 36 directly. If mobile unit 12 calls platform 18, then the call from caller 36 and the call from mobile unit 12 are coupled to complete call delivery. Platform 18 and mobile unit 12 can generate ring tones to simulate a direct call from caller 36 to mobile unit 12, as explained below with reference to FIG. 6.

Figure 2:
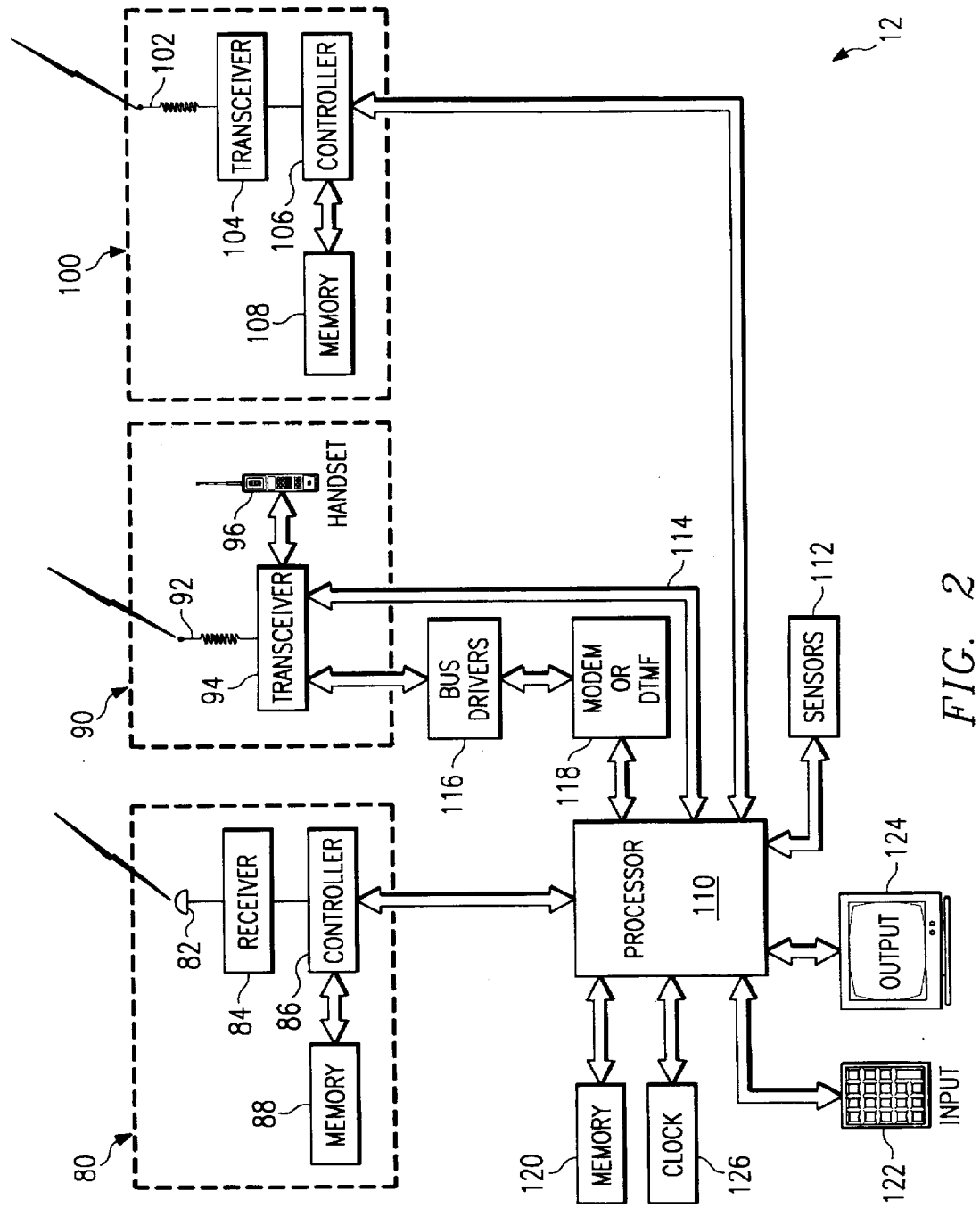
FIG. 2 is a schematic representation of a mobile unit.

FIG. 2 is a schematic representation of mobile unit 12. Mobile unit 12 includes mobile positioning receiver 80, mobile voice communications device 90, data transceiver 100, and other associated hardware and software, described below.

Mobile positioning receiver 80 includes antenna 82, receiver 84, controller 86, and memory 88. In operation, mobile positioning receiver 80 receives position information from satellites 28 over position information streams 26 at antenna 82. Receiver 84 processes the position information to extract ephemeris, almanac, and clock correction data. Controller 86 receives the position information and, optionally, directly computes a vehicle position. These calculations performed by controller 86 may use data or operational software stored in memory 88. The vehicle position derived from information received or computed by mobile positioning receiver 80 is passed to processor 110 for generation of a call delivery information report. Alternatively, sensors 112, such as an inertial navigation sensor, a dead-reckoning sensor, or a roadside positional tag reading device, generate vehicle position.

Mobile voice communications device 90 includes antenna 92, transceiver 94, and handset 96. Mobile voice communications device 90 receives information related to the communications service provider of mobile unit 12 at antenna 92. This information, such as an MSCID, SID, SWID, NPA, RAP, TLDN, or other information associated with the communications service provider passes through transceiver 94 over link 114 to processor 110 for generation of a call delivery information report. Alternatively, this information passes through bus drivers 116 and a modem or dual tone multi-frequency (DTMF) coder/decoder 118 to processor 110.

Antenna 92 and transceiver 94 also receive calls placed by caller 36 and delivered to mobile unit 12, and place calls in response to a call back message received from platform 18. The user of mobile unit 12 communicates with caller 36 over handset 96. The delivered call to mobile unit 12 is a traditional voice call, a combination of a voice call with embedded or interleaved data, or a call to transfer data to mobile unit 12 over bus drivers 116 and modem or DTMF coder/decoder 118. For example, mobile voice communications device 90 can receive a call over mobile voice communications network 20 to download data to processor 110 or attached memory 120. The data to be downloaded can be updates to operational software of mobile unit 12, messages to operator of mobile unit 12, or other information for operation of mobile unit 12. This information can be generated by caller 36 or platform 18.

Data transceiver 100 includes an antenna 102, a transceiver 104, a controller 106, and a memory 108. In operation, data transceiver 100 sends and receives data from data communications network 16. For example, processor 110 generates a call delivery information report, based on positional information received from mobile positioning receiver 80 or communications service provider information received from mobile voice communications device 90, and passes this call delivery information report to controller 106 of data transceiver 100. Controller 106 formats the report for transmission and transceiver 104 transmits the report over antenna 102. Controller 106 accesses operational software or other data stored in memory 108 during operation of data transceiver 100.

Data transceiver 100 also receives data from data communications network 16 at antenna 102, and passes this data through transceiver 104 and controller 106 to processor 110. For example, data transceiver 100 can receive a call back message from platform 18 and pass this message to processor 110, which can inform operator of mobile unit 12 or initiate a call using mobile voice communications device 90 in response to the call back message. Therefore, data transceiver 100 provides data transmission and reception capabilities over data communications network 16 and directly links this information to processor 110.

Processor 110 manages the communicating, processing, locating, and reporting features of mobile unit 12. In one operation, processor 110 receives call delivery information from mobile positioning receiver 80 or mobile voice communications device 90 and prepares a call delivery information report. Processor 110 delivers the call delivery information report to data transceiver 100 for transmission over data communications network 16 to platform 18. In another operation, processor 110 receives a call back message from data transceiver 100, and initiates a call using mobile voice communications device 90.

Memory 120 contains programs, maps, databases, and other information used by processor 110 to perform its functions. Memory 120 can be random access memory (RAM), read-only memory (ROM), CD-ROM, removable memory devices, or any other device that allows storage or retrieval of data. Processor 110 and controllers 86 and 106 as well as memories 88, 108 and 120, may be separate or integral components of mobile unit 12. Mobile unit 12 contemplates any arrangement, processing capability, memory allocation, or task assignment between mobile positioning receiver 80, mobile voice communications device 90, data transceiver 100, processor 110, and memory 120.

Processor 110 is also coupled to input device 122 and output device 124. Input device 122 is a keypad, touch screen, voice recognition software and related hardware, or other device that can accept information, such as digital data or audible commands. Output device 124 conveys information associated with the operation of mobile unit 12, including digital data, visual information, or audio information. Both input device 122 and output device 124 include fixed or removable storage media, such as magnetic computer disks, CD-ROM, or other suitable media to both receive output from and provide input to processor 110 or memory 120. For example, information correlating position of mobile unit 12 to identifiers of communications service providers is provided to input device 122 and stored in memory 120.

In one aspect of the present invention, platform 18 sends a message to data transceiver 100 requesting mobile unit 12 to call platform 18 or another party. Antenna 102 receives the call back message and passes it through transceiver 104 and controller 106 to processor 110. Output device 124, at the direction of processor 110, can notify the operator of mobile unit 12 to place the requested call. For example, output device 124 can display the time of the call back message, a short message, and a telephone number for the operator to call. Alternatively, processor 110 can automatically initiate a call back using mobile voice communications device 90 without operator intervention.

The operator either manually inputs the phone number using input device 122 or handset 96, or processor 110 directs appropriate hardware to automatically place the call to the desired number. Upon successfully placing a call with the telephone number specified in the call back message, operator of mobile unit 12 commences voice communications over handset 96. In one embodiment, handset 96 or output device 124 can generate a ring tone after establishing communications to alert operator of mobile unit 12 of a delivered call.

Call delivery system 10 can reduce the cost and complexity of delivering calls to mobile unit 12 by minimizing the call delivery information transmitted by data transceiver 100 to platform 18. Processor 110 collects various pieces of information from positioning receiver 80, mobile voice communications device 90, sensors 112, memory 120, input device 122, or other sources, and distills this information into a call delivery information report for transmission over data transceiver 100. The call delivery information report can be time-stamped using time generated by clock 126 coupled to processor 110.

In addition to call delivery information, processor 110 and data transceiver 100 report other information to platform 18 or caller 36. This information originates from sensors 112, such as engine sensors, truck-trailer sensors, security monitors, on-board positioning sensors or other devices generating information on the status or condition of mobile unit 12, vehicle 14, or its operator. The operator can also compose a data message for transmission using input device 122.

Components of mobile unit 12 shown in FIG. 2 are packaged in one or more housings. Mobile unit 12 mounts to vehicle 14 or an object to be tracked. Mobile unit 12 can also be packaged as a portable, hand-held device that provides personal timing, locating, communicating, and reporting functions. For example, police, firefighters, rescue teams, service and delivery personnel, individuals that may change forms of transportation, or other persons requiring portable communications can use a hand-held mobile unit 12.

Figure 3:
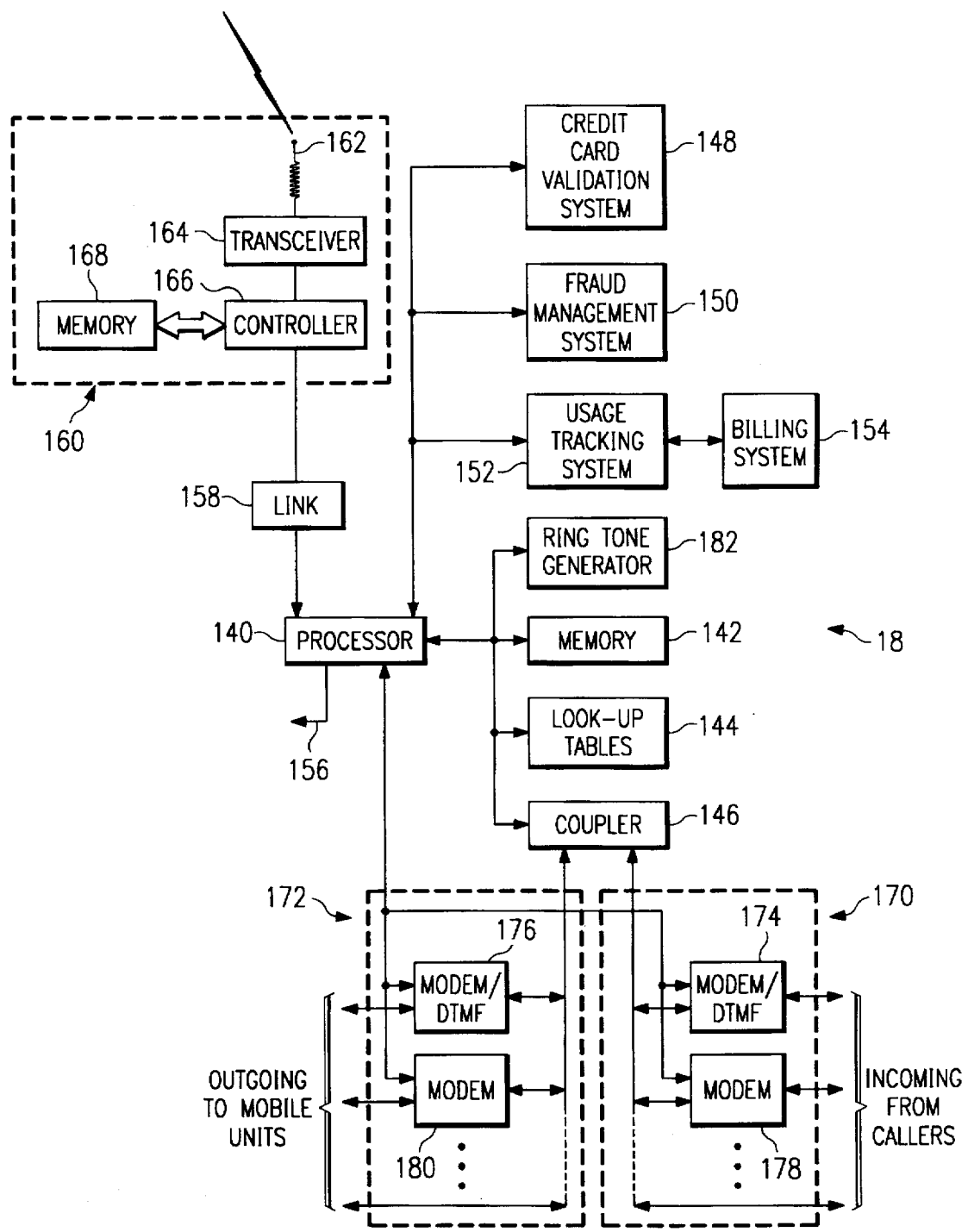
FIG. 3 is a schematic representation of a platform for delivering calls to the mobile unit.

FIG. 3 illustrates a block diagram of platform 18 that delivers calls to mobile unit 12 in response to reported call delivery information. Platform 18 also generates and delivers call back messages directing mobile unit 12 to call platform 18 or caller 36. Platform 18 includes a processor 140 coupled to memory 142, look-up tables 144, and coupler 146. Processor 140 is also coupled to credit card validation system 148, fraud management system 150, usage tracking system 152, and billing system 154. Processor 140 communicates with other similarly functioning platforms in a distributed platform embodiment or with home switch 42 or other switches 48 over communications link 156. Communications link 156 can be a portion of the nation-wide SS7 backbone that interconnects components of PSTN 38, or any other dedicated or switched communications link.

Platform 18 is also coupled to data transceiver 160 over link 158. Data transceiver 160 can be integral to or separate from platform 18. For example, data transceiver 160 can be disposed at a central messaging center of data communications network 16 which is remotely located from platform 18. Link 158 can be any appropriate dedicated or switched link that supports communication of data between platform 18 and data transceiver 160.

Data transceiver 160 is similar in construction and operation to data transceiver 100 in mobile unit 12. Data transceiver 160 includes antenna 162, transceiver 164, controller 166, and memory 168. In operation, data transceiver 160 receives data messages from and transmits data messages to mobile unit 12 using data communications network 16. In a typical configuration, data transceiver 160 receives call delivery information reports from many mobile units 12 and requires a higher capacity design than data transceiver 100 in mobile unit 12. Antenna 162 receives an incoming call delivery information report from mobile unit 12 and passes the report to transceiver 164. Controller 166 receives the report from transceiver 164 and passes the report to processor 140 over link 158. Controller 166 accesses operational software and other data stored in memory 168 to control the operation of data transceiver 160. Data transceiver 160 also receives call back messages from platform 18 using link 158, and transmits call back messages to mobile unit 12 using data communications network 16. The call back message transmitted by data transceiver 160 can be broadcast without the need for location information of mobile unit 12, or data transceiver 160 can use location information of mobile unit 12 stored at platform 18 to communicate the call back message.

Coupler 146 in platform 18 couples links 170 with links 172, also referred to in the singular as link 170 and link 172. Links 170 couple platform 18 with PSTN 38, other networks 41, home switch 42, and other switches 48 to allow callers 36, desiring to place a call to mobile unit 12, to connect with platform 18. Links 172 couple platform 18 with mobile unit 12. Links 170 and links 172 can include modem and DTMF coder/decoders 174 and 176 or modems 178 and 180. Platform 18 supports voice calls, voice calls with embedded or interleaved data, and partially or fully encoded data calls using modem/DTMF 174 and 176 or modem 178 and 180. Coupler 146, under the direction of processor 140, couples link 170 with link 172 to complete delivery of a call from caller 36 to mobile unit 12. Coupler 146, link 170, and link 172 include the appropriate hardware and software to control the dialing and call answering capabilities of platform 18.

Calls to and from mobile unit 12 pass through coupler 146. Processor 140 controls and monitors coupler 146 and records call information, such as the number and length of calls to each mobile unit 12, which is recorded in usage tracking system 152. In this manner, billing system 154 generates bills for use of platform 18. If several mobile units 12 are associated with a particular company or organization, such as a fleet of trucks, billing system 154 generates a consolidated bill for all calls to and from mobile units 12 installed in the fleet of trucks.

A fraud management system 150 performs an optional security handshake protocol between platform 18 and mobile unit 12 or between platform 18 and caller 36. This security handshake ensures that only authorized calls are made to and from mobile unit 12 over link 172. If the security handshake is not executed correctly, then processor 140 disconnects the call through coupler 146, which greatly reduces costs resulting from unauthorized use of mobile voice communications network 20. Fraud management system 150 can also perform a similar security handshake on calls received from caller 36 at link 170. In addition to fraud management, credit card validation system 148 can validate credit card calls made to platform 18, either from caller 36 or mobile unit 12. Platform 18 can either perform or not perform either a security handshake or credit card validation on communications with either caller 36 or mobile unit 12.

In operation, data transceiver 160 receives a call delivery information report from mobile unit 12. Data transceiver 160 passes the report to processor 140 of platform 18 using link 158. Processor 140 validates the report using fraud management system 150 and logs the report for usage tracking system 152 and billing system 154. Processor 140 stores the call delivery information report time-stamped and indexed by mobile unit identification number in memory 142. Processor 140 can communicate the call delivery information report using link 156 to home switch 42, other switches 48, or other platforms 18 in a distributed platform system.

Platform 18 receives a call for mobile unit 12 on link 170. A caller 36 establishes a connection with link 170 by placing a call, such as a 1+800 call, to platform 18 or by placing a call to home switch 42 or other switches 48, which then direct the call to platform 18. Caller 36 enters a telephone number or other mobile unit identification number, which is decoded by modem/DTMF 174 or modem 178 and passed to processor 140. Processor 140 validates the mobile unit identification number and upon validation accesses the most recent call delivery information report stored in memory 142 indexed by the mobile unit identification number.

Depending on the type of call delivery information retrieved from memory 142, processor 140 performs additional processing using look-up tables 144 to determine a proper dialing number and method to establish communications with mobile unit 12. Processor 140 directs coupler 146 to place a call to mobile unit 12 using link 172. Upon establishing a communications link with mobile unit 12, coupler 146 couples link 170 connecting caller 36 with link 172 connecting mobile unit 12.

In another embodiment, platform 18 receives a call from caller 36 at link 170 and generates a call back message to be delivered to mobile unit 12. The call back message is communicated to data transceiver 160 using link 158. Data transceiver 160 either broadcasts the message for receipt by mobile unit 12 or directs the message to mobile unit 12 using location information from platform 18.

The call back message directs mobile unit 12 to call platform 18 or to directly call a number specified by caller 36. If the call back message requests mobile unit 12 to call platform 18, then coupler 146 maintains link 170 with caller 36. Mobile unit 12 calls platform 18 and establishes a connection using link 172. Coupler 146, under the direction of processor 140, then connects the call from mobile unit 12 on link 172 with the call from caller 36 on link 170. A ring tone generator 182 can produce an audible ring tone to caller 36 to create the illusion that the call is being directly placed with mobile unit 12. In addition, mobile unit 12 can call platform 18 without operator intervention. When the connection is established, an audible ring can be generated at mobile unit 12 by output device 124 or handset 96 to inform the operator of the call from caller 36. By generating a ring tone to caller 36 and a ring tone at mobile unit 12, call delivery system 10 supports an apparent direct dial call from caller 36 to mobile unit 12.

Alternatively, the call back message sent by data transceiver 160 to mobile unit 12 over data communications network 16 specifies a direct dial number to caller 36. In this embodiment, platform 18 disconnects caller 36 on link 170 and mobile unit 12 calls caller 36 directly using the direct dial number provided in the message transmitted by data transceiver 160.

Figure 4:
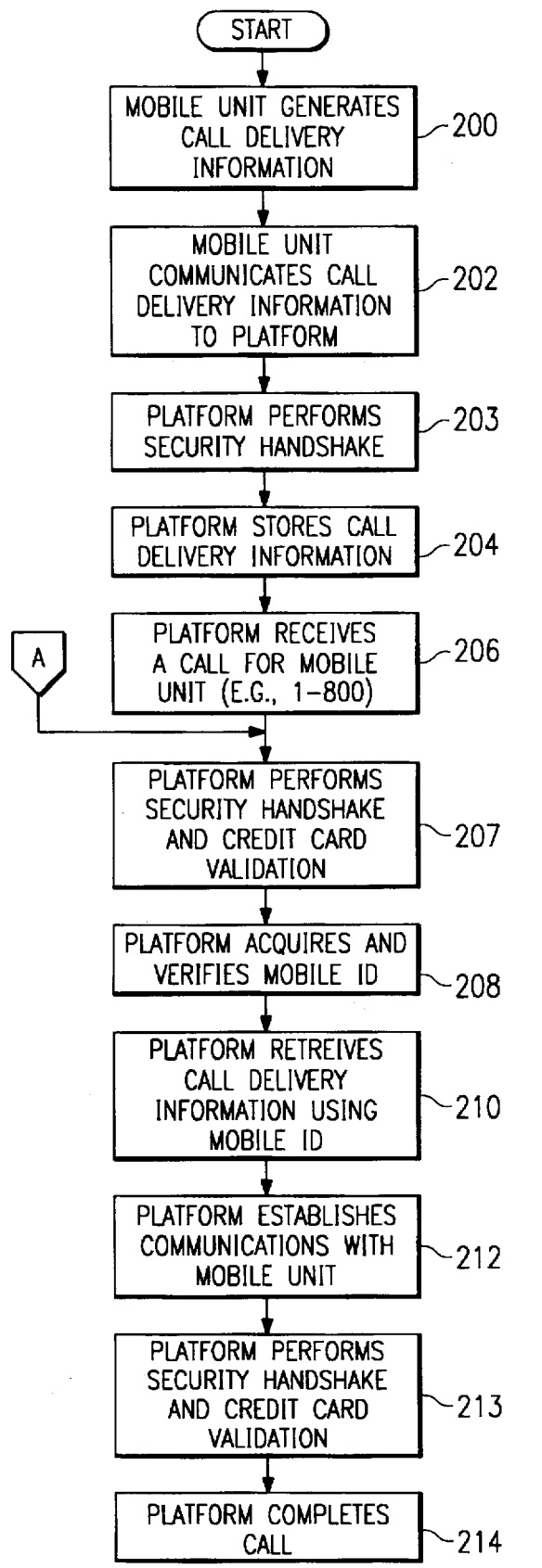
FIG. 4 is a flow chart of a method for delivering a call to a mobile unit.

FIG. 4 is a flow diagram that illustrates a method for delivering a call to mobile unit 12. The procedure begins when mobile unit 12 generates call delivery information at step 200. Mobile unit 12 communicates call delivery information to platform 18 at step 202. Platform 18 performs a security handshake using fraud management system 150 at step 203. Upon successfully executing the security protocol, platform 18 stores call delivery information at step 204, and may retransmit call delivery information to other platforms 18, home switch 42, or other switches 48.

Platform 18 receives a call for mobile unit 12 from caller 36 at step 206. At step 207, platform 18 performs a security handshake using fraud management system 150 and credit card validation using credit card validation system 148 if caller 36 placed a credit card call. Upon successfully executing the security protocol and validating the credit card of caller 36, platform 18 acquires and verifies the mobile unit identification number at step 208 and retrieves the most recently reported call delivery information of mobile unit 12 using the mobile unit identification number at step 210. Platform 18 establishes a communications link with mobile unit 12 using mobile voice communications network 20 at step 212 and performs a security handshake with mobile unit 12 and, optionally, a credit card validation at step 213. Platform 18 completes the call by coupling caller 36 to mobile unit 12 at step 214.

Figure 5:
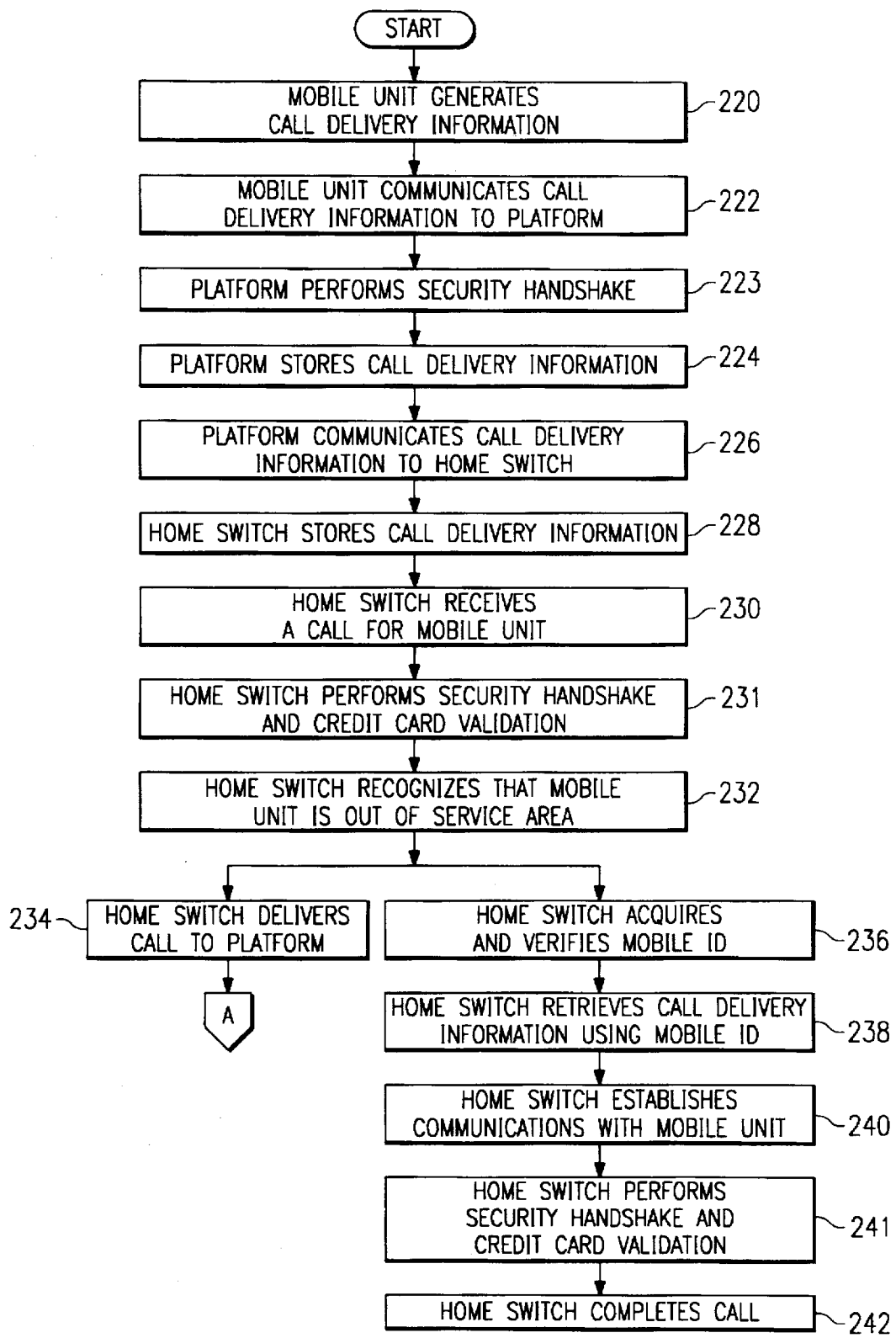
FIG. 5 is a flow chart of a method for delivering a call placed at a home switch to a mobile unit.

FIG. 5 illustrates a method for delivering a call placed by caller 44 coupled to home switch 42 or another caller coupled to other switches 48. This procedure begins when mobile unit 12 generates call delivery information at step 220 and communicates the call delivery information to platform 18 using data transceiver 100 and data communications network 16 at step 222. Platform 18 performs a security handshake using fraud management system 150 at step 223. Upon successfully executing the security protocol, platform 18 stores the call delivery information indexed by time and mobile unit identification number at step 224. In this embodiment, platform 18 communicates call delivery information to home switch 42 at step 226, and home switch 42 stores the call delivery information received from platform 18 at step 228.

Home switch 42 receives a call for mobile unit 12 from caller 44 at step 230. At step 231, platform 18 performs a security handshake using fraud management system 150 and credit card validation using credit card validation system 148 if caller 44 placed a credit card call. Upon successfully executing the security protocol and validating the credit card of caller 44, home switch 42 polls mobile unit 12, retrieves stored call delivery information, or uses some other method to recognize that mobile unit 12 is out of the service area of home switch 42 at step 232. Home switch 42 can deliver the call to mobile unit 12 using two different methods. In the first method, home switch 42 delivers the call to platform 18 at step 234 and allows platform 18 to complete the call, as shown in steps 207 through 214 of FIG. 4.

In the second method, home switch 42 acquires and verifies the mobile unit identification number as entered automatically or manually by caller 44 at step 236. Home switch 42 retrieves the most recent call delivery information provided by platform 18 using the mobile unit identification number at step 238. Home switch 42 establishes communications with mobile unit 12 using mobile voice communications network 20 at step 240 and performs a security handshake with mobile unit 12 and, optionally, a credit card validation at step 241. Platform 18 completes the call from caller 44 to mobile unit 12 at step 242.

Figure 6:
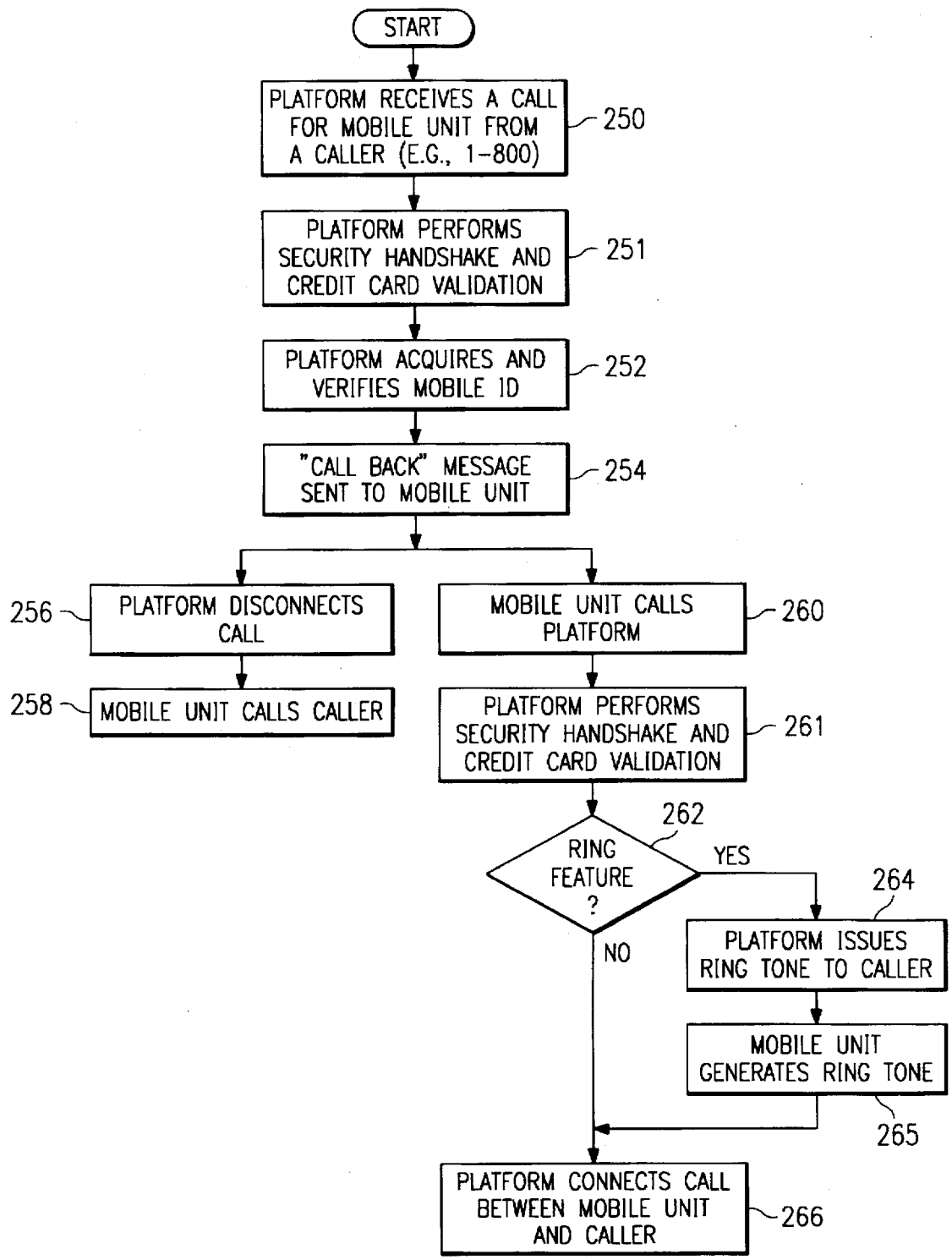
FIG. 6 is a flow chart of a method for requesting a call back from the mobile unit.

FIG. 6 illustrates a method for delivering a call using a call back message. This procedure begins when platform 18 receives a call for mobile unit 12 from caller 36 at step 250. At step 251, platform 18 performs a security handshake using fraud management system 150 and credit card validation using credit card validation system 148 if caller 36 placed a credit card call. Upon successfully executing the security protocol and validating the credit card of caller 36, platform 18 acquires and verifies a mobile unit identification number entered automatically or manually by caller 36 at step 252. Platform 18 sends a call back message to data transceiver 160 using link 158, and data transceiver 160, as part of or separate from platform 18, transmits the call back message to mobile unit 12 using data communications network 16 at step 254.

If the call back message sent from data transceiver 160 to mobile unit 12 specifies a direct dial number for caller 36, then platform 18 disconnects the call at step 256 and mobile unit 12 uses the direct dial number provided in the call back message to place a call directly to caller 36 at step 258.

In another embodiment, the call back message requests mobile unit 12 to call platform 18 at step 260. At step 261, platform 18 may perform a security handshake using fraud management system 150 and credit card validation using credit card validation system 148 if mobile unit 12 placed a credit card call. Upon successfully executing the security protocol and validating the credit card of mobile unit 12, platform 18 determines if a ring feature is implemented at step 262.

If a ring feature is implemented, platform 18 uses ring tone generator 182 to generate an audible ring tone to caller 36 at step 264. A ring tone can also be generated by output device 124 or handset 96 of mobile unit 12 at step 265. Therefore, mobile unit 12 can receive a call back message, call platform 18, and establish communications without user intervention. In such a case, the ring tone generated at mobile unit 12 appears as a direct dial telephone call from caller 36. Whether a ring feature is implemented or not, platform 18 completes call delivery by connecting the call between caller 36 and mobile unit 12 at step 266.

Although the present invention has been described with several embodiments, various changes and modifications may be suggested to one skilled in the art, and it is intended that the present invention encompass such changes and modifications as fall within the scope of the appended claims.

What is claimed is:

1. A system for delivering a voice call to a user at a mobile unit, comprising:

a mobile voice communications network;

a data communications network;

the mobile unit comprising a data transmitter coupled to the data communications network and a processor operable to receive call delivery information relating to the mobile voice communications network without input from the user, the data transmitter operable to communicate call delivery information received by the processor using the data communications network, the mobile unit further comprising a mobile voice communications transceiver coupled to the mobile voice communications network; and a platform coupled to the data communications network and the mobile voice communications network, the platform comprising a data receiver coupled to the data communications network, the data receiver operable to receive call delivery information communicated by the data transmitter of the mobile unit, the platform operable to receive the voice call and to deliver the voice call in response to the call delivery information received by the data receiver, to the mobile voice communications transceiver of the mobile unit.

2. The system of claim 1, wherein the mobile voice communications network is a cellular telephone network.

3. The system of claim 1, wherein the data communications network is a satellite-based data messaging system.

4. The system of claim 1, wherein the mobile unit further comprises a positioning receiver, the positioning receiver operable to determine the location of the mobile unit, wherein the call delivery information comprises the location of the mobile unit determined by the positioning receiver.

5. The system of claim 1, wherein the mobile voice communications transceiver on the mobile unit is operable to receive call delivery information from a communications service provider of the mobile voice communications network, the mobile voice communications transceiver further operable to provide the call delivery information to the data transmitter for communication to the platform.

6. The system of claim 1, wherein the platform further comprises:

a first link operable to receive the voice call;

a second link coupled to the mobile voice communications network, the second link operable to establish, in response to the call delivery information received by the data receiver, communications with the mobile voice communications transceiver of the mobile unit; and a coupler operable to couple the first and second links to deliver the voice call to the mobile unit.

7. The system of claim 1, further comprising a switch coupled to the platform, the switch operable to receive the voice call to the mobile unit, the switch further operable to route the voice call to the platform.

8. The system of claim 7, wherein the switch is the home switch of the mobile unit.

9. A mobile apparatus to receive a voice call from a remote site, the apparatus coupled to a data communications network and a mobile voice communications network, the apparatus comprising:

a processor operable to receive call delivery information relating to the mobile voice communications network without input from a user of the mobile apparatus;

a data transmitter coupled to the processor and the data communications network, the data transmitter operable to communicate call delivery information received by the processor to the remote site using the data communications network; and a mobile voice communications transceiver coupled to the mobile voice communications network, the mobile voice communications transceiver operable to receive the voice call from the remote site, the voice call delivered from the remote site to the mobile voice communications transceiver in response to call delivery information transmitted by the data transmitter to the remote site.

10. The apparatus of claim 9, wherein the mobile voice communications network is a cellular telephone network.

11. The apparatus of claim 9, wherein the data communications network is a satellite-based data messaging system.

12. The apparatus of claim 9, further comprising a positioning receiver, the positioning receiver operable to determine the location of the apparatus, wherein the call delivery information comprises the location of the apparatus determined by the positioning receiver.

13. The apparatus of claim 9, wherein the mobile voice communications transceiver on the mobile apparatus is operable to receive call delivery information from a communications service provider of the mobile voice communications network, the mobile voice communications transceiver further operable to provide the call delivery information to the data transmitter for communication to the remote site.

14. An apparatus for delivering a voice call to a user at a mobile unit equipped with a mobile voice communications transceiver, the apparatus coupled to a data communications network and a mobile voice communications network, the apparatus comprising:

a data receiver coupled to the data communications network, the data receiver operable to receive call delivery information relating to the mobile voice communications network received by a processor of the mobile unit without input from the user;

a first link operable to receive the voice call;

a second link coupled to the mobile voice communications network, the second link operable to establish communications with the mobile unit in response to the call delivery information received by the processor of the mobile unit and received by the data receiver; and a coupler operable to couple the first and second links to deliver the voice call to the mobile unit.

15. The apparatus of claim 14, wherein the mobile voice communications network is a cellular telephone network.

16. The apparatus of claim 14, wherein the data communications network is a satellite-based data messaging system.

17. The apparatus of claim 14, further comprising a memory coupled to the data receiver, the memory operable to store call delivery information indexed by a mobile unit identification number.

18. The apparatus of claim 14, further comprising a memory coupled to the data receiver, the memory operable to store call delivery information indexed by a mobile unit identification number, the first link operable to receive the mobile unit identification number, the second link operable to establish, in response to the call delivery information stored in the memory and indexed by the received mobile unit identification number, communications with the mobile unit.

19. The apparatus of claim 14, wherein the call delivery information includes a position of the mobile unit.

20. The apparatus of claim 14, wherein the mobile voice communications network is a cellular telephone network, and wherein the call delivery information includes information identifying the cellular telephone system providing service to the mobile unit.

21. A method for delivering a voice call to a user at a mobile unit, comprising:

receiving call delivery information relating to a mobile voice communications network at a processor of the mobile unit without input from the user;

communicating from the mobile unit to a platform, using a data communications network, the call delivery information received by the processor;

receiving a voice call for the mobile unit at the platform;

establishing, in response to the call delivery information received from the mobile unit, a communications link between the platform and the mobile unit using the mobile voice communications network; and coupling the voice call to the communications link.

22. The method of claim 21, wherein the data communications network is a satellite-based data messaging network.

23. The method of claim 21, wherein the mobile voice communications network is a cellular telephone network.

24. The method of claim 21, wherein the step of generating call delivery information comprises receiving call delivery information from a position locating system.

25. The method of claim 21, wherein the step of generating call delivery information comprises receiving call delivery information from the communications service provider of the mobile voice communications network providing service to the mobile unit.

26. The method of claim 21, wherein the call delivery information includes a mobile unit identification number, and further comprising the step of storing call delivery information at the platform indexed by the mobile unit identification number.

27. The method of claim 21, wherein the call delivery information includes a mobile unit identification number, and further comprising the step of storing call delivery information at the platform indexed by the mobile unit identification number upon successful verification of the mobile unit identification number by the platform.

28. A system for delivering a voice call to a user at a vehicle, comprising:

a mobile voice communications network;

a data communications network, the data communications network operating independently from the mobile voice communications network;

a mobile unit on the vehicle, the mobile unit comprising:

a processor operable to receive call delivery information relating to the mobile voice communications network without input from the user;

a data transmitter coupled to the processor and the data communications network, the data transmitter operable to communicate call delivery information received by the processor using the data communications network; and a mobile voice communications transceiver coupled to the mobile voice communications network; and a platform coupled to the data communications network and the mobile voice communications network, the platform comprising:

a data receiver coupled to the data communications network, the data receiver operable to receive call delivery information communicated by the data transmitter of the mobile unit;

a first link operable to receive the voice call;

a second link coupled to the mobile voice communications network, the second link operable to establish, in response to the call delivery information received by the data receiver, communications with the mobile voice communications transceiver on the vehicle; and a coupler operable to couple the first and second links to deliver the voice call to the vehicle.

* * * * *